(12) United States Patent
Levy

(10) Patent No.: US 9,210,405 B2
(45) Date of Patent: Dec. 8, 2015

(54) SYSTEM AND METHOD FOR REAL TIME 2D TO 3D CONVERSION OF VIDEO IN A DIGITAL CAMERA

(75) Inventor: Noam Levy, Karmiel, IL (US)

(73) Assignee: QUALCOMM TECHNOLOGIES, INC., San Diego, CA (US)

( * ) Notice: Subject to any disclaimer, the term of this patent is extended or adjusted under 35 U.S.C. 154(b) by 659 days.

(21) Appl. No.: 13/427,768

(22) Filed: Mar. 22, 2012

(65) Prior Publication Data
US 2013/0250053 A1 Sep. 26, 2013

(51) Int. Cl.
*H04N 13/02* (2006.01)

(52) U.S. Cl.
CPC ......... *H04N 13/026* (2013.01); *H04N 13/0207* (2013.01)

(58) Field of Classification Search
None
See application file for complete search history.

(56) References Cited

U.S. PATENT DOCUMENTS

| | | | |
|---|---|---|---|
| 2002/0113884 A1* | 8/2002 | Tanii et al. | 348/241 |
| 2004/0218269 A1* | 11/2004 | Divelbiss et al. | 359/464 |
| 2007/0040924 A1 | 2/2007 | Cho et al. | |
| 2007/0286476 A1* | 12/2007 | Kim et al. | 382/154 |
| 2008/0080852 A1 | 4/2008 | Chen et al. | |
| 2010/0026783 A1* | 2/2010 | Chiu et al. | 348/43 |
| 2010/0080481 A1 | 4/2010 | Chen et al. | |
| 2010/0141757 A1 | 6/2010 | Baik et al. | |
| 2012/0056887 A1 | 3/2012 | Kim et al. | |
| 2012/0081553 A1* | 4/2012 | Cote et al. | 348/207.1 |
| 2013/0070050 A1* | 3/2013 | Ha et al. | 348/43 |

FOREIGN PATENT DOCUMENTS

WO 2008/016882 A2 2/2008

OTHER PUBLICATIONS

Search Report mailed on Jul. 26, 2013 in UK Patent Application No. GB1301955.9.

* cited by examiner

*Primary Examiner* — Kevin McInnish
(74) *Attorney, Agent, or Firm* — Knobbe, Martens, Olson & Bear LLP

(57) ABSTRACT

Embodiments are directed towards enabling digital cameras to digitally process captured two dimensional image sequences at a real time video rate, to convert the two dimensional image sequences into stereoscopic three dimensional image sequences. In one embodiment, using a pipelining architecture, various statistics are obtained for a captured two dimensional sequence. The statistics are used to estimate depth within each frame image within the sequence, in real time. Using the depth data a disparity map is generated that is provided to a warping component to generate a second perspective of the two dimensional image. The two images for the frame provide a three dimensional perspective for the frame within the sequence. Together the two perspective images for the frame are provided to a video encoder component to encode the stereoscopic three dimensional frame for the sequence.

17 Claims, 10 Drawing Sheets

SYSTEM AND METHOD FOR REAL TIME 2D TO 3D CONVERSION OF VIDEO IN A DIGITAL CAMERA

TECHNICAL FIELD

The present embodiments relate generally to digital video image processing and, more particularly, but not exclusively, to at least using a digital camera to obtain statistics during capture of a two dimensional video image sequence to estimate depth in each frame in the sequence and to convert the image sequence in real time to a three dimensional image sequence.

BACKGROUND

For years, people have watched their televisions display images in a flat two-dimensional representation. While providing significant excitement, such displays have lacked the additional excitement that can be brought about by images that are displayed in three dimensions (3D). Recently, however, many television manufacturers have been manufacturing 3D televisions, using a variety of techniques, including stereoscopic displays, multi-view displays, 2D-plus-depth displays, and 3D displays, as well as a variety of other technique, to project three dimensional images for viewing.

However, creating three dimensional image sequences for display often involves recording of multiple video streams, one stream for a right eye perspective, and another stream for a left eye perspective. These two views are typically captured by specialized imaging systems often with dual cameras that may rotate inward, to simulate how a person's eyes might look towards an object. The two image views are then processed after a video stream or single image is captured to create images that are perceived as three dimensional. Such post-processing is often complex and may involve significant computing resources. While providing three-dimensional content to the viewing public, such complexities have limited the ability for a typical consumer to produce their own three-dimensional video sequences. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION OF THE EMBODIMENTS

Figure 1:
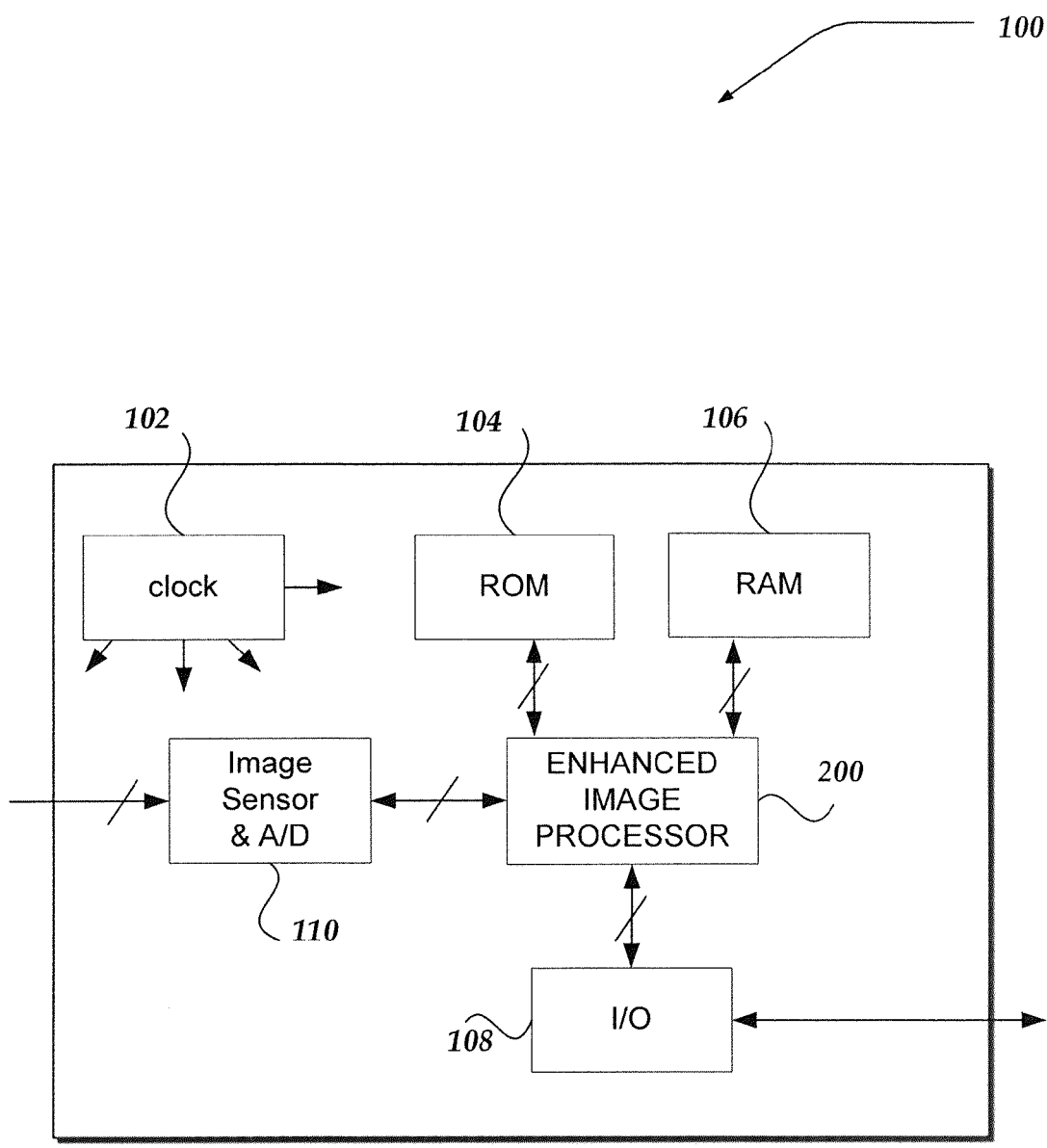
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "image," or "image data," refers to data that defines an image to be displayed in at least two dimensions, and may take the form of a single display of the image, or a time varying display of a sequence of images comprising multiple video frames which may be spaced in time. As described herein such two dimensional images are dynamically converted in real time to three dimensional images, wherein the images that are converted may also represent a sequence of images comprising multiple video frames in a video stream.

As used herein, the term "real time" refers to processing of an image (or other data) as soon as the image or image data is received or captured. Thus, real time indicates that the image is processed at least at a same rate in which the image is received (or captured). This is sometimes also referred to as "real time video rate".

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards enabling handheld digital cameras or other devices having a digital camera component to digitally process captured two dimensional images at a real time video rate, to convert the two dimensional images into stereoscopic three dimensional images. In one embodiment, using a pipelining architecture, various statistics are obtained for a captured two dimensional video image. The statistics are used to estimate depth within each frame image, in real time. Using the depth data a disparity map is generated that is provided to a warping component to generate a second perspective of the two dimensional image. The two images for the frame provide a three dimensional perspective for the frame. Together the two perspective images for the frame are provided to a video encoder component to encode the three dimensional frame.

By employing a real time pipelining architecture digital cameras may be configured to reuse many existing components in a novel way to convert images captured in two dimension into three dimensional images in a real time video rate without the need to perform extensive post processing offline after the video has been recorded to the camera's memory.

Illustrative Operating Environments

FIG. 1 shows components of an environment in which embodiments may be practiced. Not all the components may be required to practice the embodiments, and variations in the arrangement and type of the components may be made without departing from the spirit or scope of the invention. Moreover, various implementations of the system may include many more or less components than those shown in FIG. 1. However, the components shown are sufficient to disclose an illustrative embodiment for practicing the present invention.

As shown, system 100 of FIG. 1 may represent a camera or any of a variety of other possible portable devices, including cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to capture and process images, including image sequences. In one embodiment, system 100 may include components not shown, such as a lens or other optical elements, and image sensor(s) for receiving images that may be converted into a digital image for processing and subsequent storage within one or more storage devices.

As shown, system 100 may include components on a single integrated circuit chip or on a plurality of different circuit chips. In any event, components shown in FIG. 1 include a clock circuit 102 for providing clocking signals to the circuit chips and other components. While illustrated as a separate component, it should be understood that clock circuit 102 may also be included on Enhanced Image Processor (EIP) 200, or the like.

Also shown is a volatile random-access memory (RAM) circuit chip 106 that may be coupled to EIP 200 to provide temporary data storage. In one embodiment, RAM 106 may be configured to receive and store image data, such as one or more frames of image data for use by EIP 200 or output data from EIP 200, as well as to store scale factors, various statistics about an image, distortion data, depth estimation statistics, disparity map data, quantization data, and the like. A separate non-volatile read-only memory (ROM) memory chip 104 is also coupled to EIP 200 and may be employed for storage of a processor program, calibration data, look-up tables (LUTS), non-linear functions, and a variety of other data useable by system 100. In one embodiment, ROM 104 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 100, including, for example, memory cards that may, include semi-conductor flash electrically erasable and programmable read-only memory, removable rotating magnetic disk storage, removable universal serial bus (USB) devices, or any of a variety of other storage devices. In one embodiment, system 100 may also be configured through Input/Output (I/O) device 108 to access storage devices that may be external to system 100. Thus, it should be understood that EIP 200 may be configured to receive one or more frames of image data, operate upon the received one or more frames of two dimensional image data to convert the received image data into three dimensional image data, compress the three dimensional image data, and store or otherwise send a resulting compressed (encoded) bit-stream of data using a variety of storage devices, and/or communication mechanisms, and therefore is not limited to merely those described herein.

I/O device 108 includes circuitry for coupling system 100 to one or more external devices, networks or the like, and is constructed for use with one or more communication protocols and technologies, including any of a variety of communication protocols and technologies useable for communicating images, including images to and/or from system 100. In one embodiment, I/O device 108 is sometimes known as a transceiver, transceiving device, or network interface card (NIC).

I/O device 108 may also provide for various other communications, including for use various input devices, such as keypads, touch screens, or the like, as well as output devices including screen displays, audio outputs, or the like. Thus, although not shown, system 100 may also include a speaker and/or microphone that may be coupled to I/O device 108 to enable communications. System 100 may also include a display that may include a liquid crystal display (LCD), gas plasma, light emitting diode (LED), or any other type of display usable for providing text and/or an image for display. Further, in one embodiment, the display may also include a touch sensitive screen arranged to receive input from an object such as a stylus or a digit from a human hand.

Also illustrated, is an image sensor & analog-to-digital converter (A/D) that may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). Image sensor & A/D 110 may then provide the digital data to EIP 200 for processing. In one embodiment, the data received by EIP 200 may be in a raw Bayer format. However, other data formats may also be used, including, for example, the image data may be defined by three components of the image signal; namely, a luminance component (Y), and two complementary chrominance (color differences) components (V=R−Y) and (U=B−Y).

Figure 2:
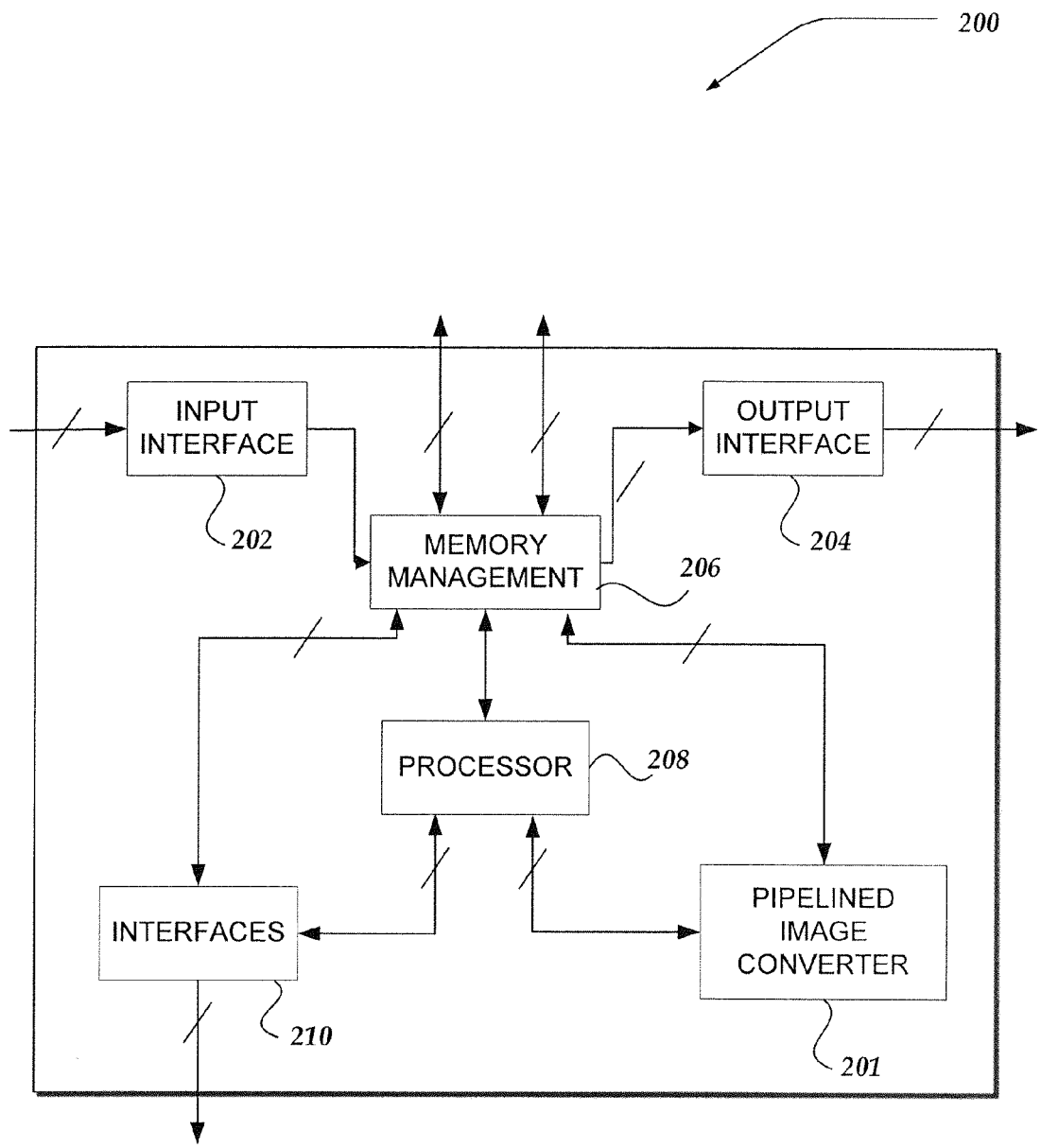
FIG. 2 shows one embodiment of an enhanced image processor usable for practicing various embodiments.

One embodiment of EIP 200 is shown in FIG. 2. EIP 200 may include many more or less components than those shown. The components shown, however, are sufficient to disclose an illustrative embodiment for practicing various embodiments.

As shown in FIG. 2, EIP 200 may include processor 208 that may represent a general purpose or a specialized central processing unit (CPU) that is configured to perform a variety of calculations on an image and/or sequence of images and to control various operations of system 100 in response to computer-readable instructions that may be stored within one of the memory devices of FIG. 1, such as ROM 104, or the like. In one embodiment, digital data of one or more image frames may be received by input interface circuit 202 and communicated to other components by connection through memory management device 206. In one embodiment, Pipelined Image Converter (PIC) 201 may be employed as described further below, pipeline operations as described further below to receive in real time captured images in two dimensions. An estimate of distance (or relative distance) is determined of a viewer to each pixel in the image. A stereo pair of images is then artificially produced by placing an imaginary camera at a second, complementary location and warping the received frame to look as if another image for the frame had been captured using the imaginary camera. The result is to convert the received two dimensional image into a stereoscopic three dimensional image. The three dimensional image may then be encoded as a compressed bit-stream representing the three dimensional image that may be output through output interface circuit 204 to various memory storage devices, or even over a network, including, a wireless and/or wired network, to another device.

Interfaces 210 may provide for various mechanisms to communicate with processor 208 and/or memory management 206, other components, to enable modifications to various actions, provide status of an action, or the like by another device, an end-user, or the like.

Figure 3:
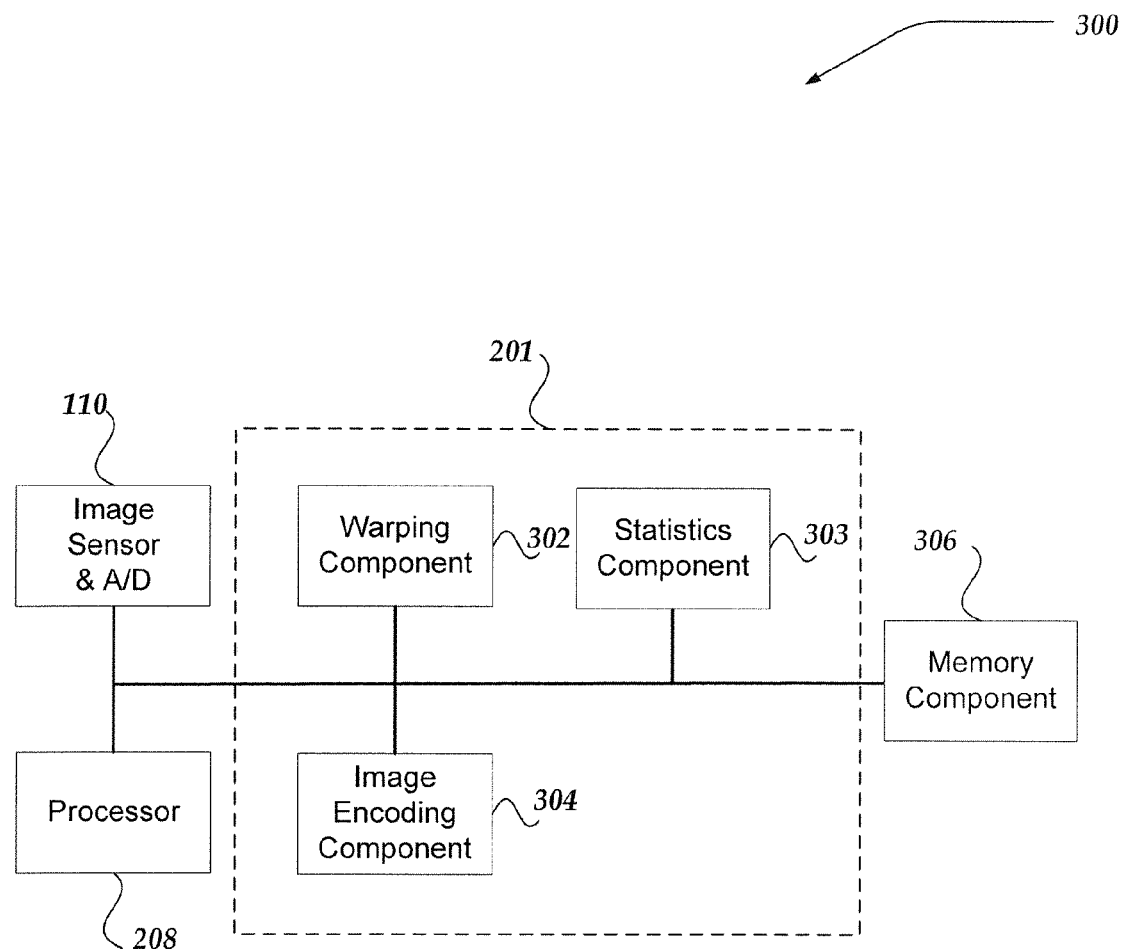
FIG. 3 illustrates one embodiment of an architecture useable with the enhanced image processor for dynamically creating three-dimensional video sequences in real time.

FIG. 3 illustrates one embodiment of an architecture useable with the enhanced image processor for dynamically creating three-dimensional video sequences in real time. Architecture 300 of FIG. 3 may include many more or less components than those shown. The components shown, however, are sufficient to disclose an illustrative embodiment for practicing various embodiments.

As shown, architecture 300 includes image sensor & A/D 110, processor 208, PIC 201, and memory component 306, each of which are described above with respect to FIGS. 1-2. For example, memory component 306 may represent ROM 104 and/or RAM 106 of FIG. 1. However, as shown, PIC 201 also includes warping component 302, statistics component 303, and image encoding component 304, each of which may represent integrated circuits elements or sub-components on an integrated circuit board, such as an application-specific integrated circuit (ASIC), or the like, where processor 208 is configured to manage the pipelining operations for architecture 300.

Briefly, as noted above, image sensor & A/D 110 includes an image sensor which converts a receive image to a digital representation. Statistics component 303 is configured to provide various statistics, including statistics that may be useable to support auto exposure activities, auto white balance, and/or auto focus. Sometimes, such statistics are referred to as AAA. In any event, statistics component 303 may determine the statistics based on a received digital image, and then provide the statistics to processor 208 to adjust appropriate parameters of the camera, and/or image. Warping component 302 is arranged to apply a transformation to image coordinates of a received image to, for example, correct lens distortion, such as barrel, fisheye, or the like. However, warping component 302 may also be used, as described further below to create a complementary (other eye) perspective of an image using a disparity map.

By re-using the above components in a novel way, a two-dimensional stream of N frames per second (FPS) may be transformed to a three-dimensional stream of N/2 frames per second, such that the recorded video stream is already in three-dimensions with no port processing being required and without adding of additional components within a digital camera. In one embodiment, N is 60; however other values may also be used.

System 100 of FIG. 1, which is capable of capturing images at N frames per second, captures images at N/2 frames per second. The statistics obtained from statistics component 303 may be used to estimate depth, as discussed in detail below, and the estimated depth data is then transformed to a disparity map that is subsequently used to generate the second perspective view. The second view is generated by warping component 302 by warping the image using the disparity map. In one embodiment, this may be accomplished in real time by pipelining the operations, and interleaving the workload so that any given hardware component, using a single frame time, has time to perform its ordinary task in the capture flow and its additional task in the 2D to 3D flow.

Figure 4:
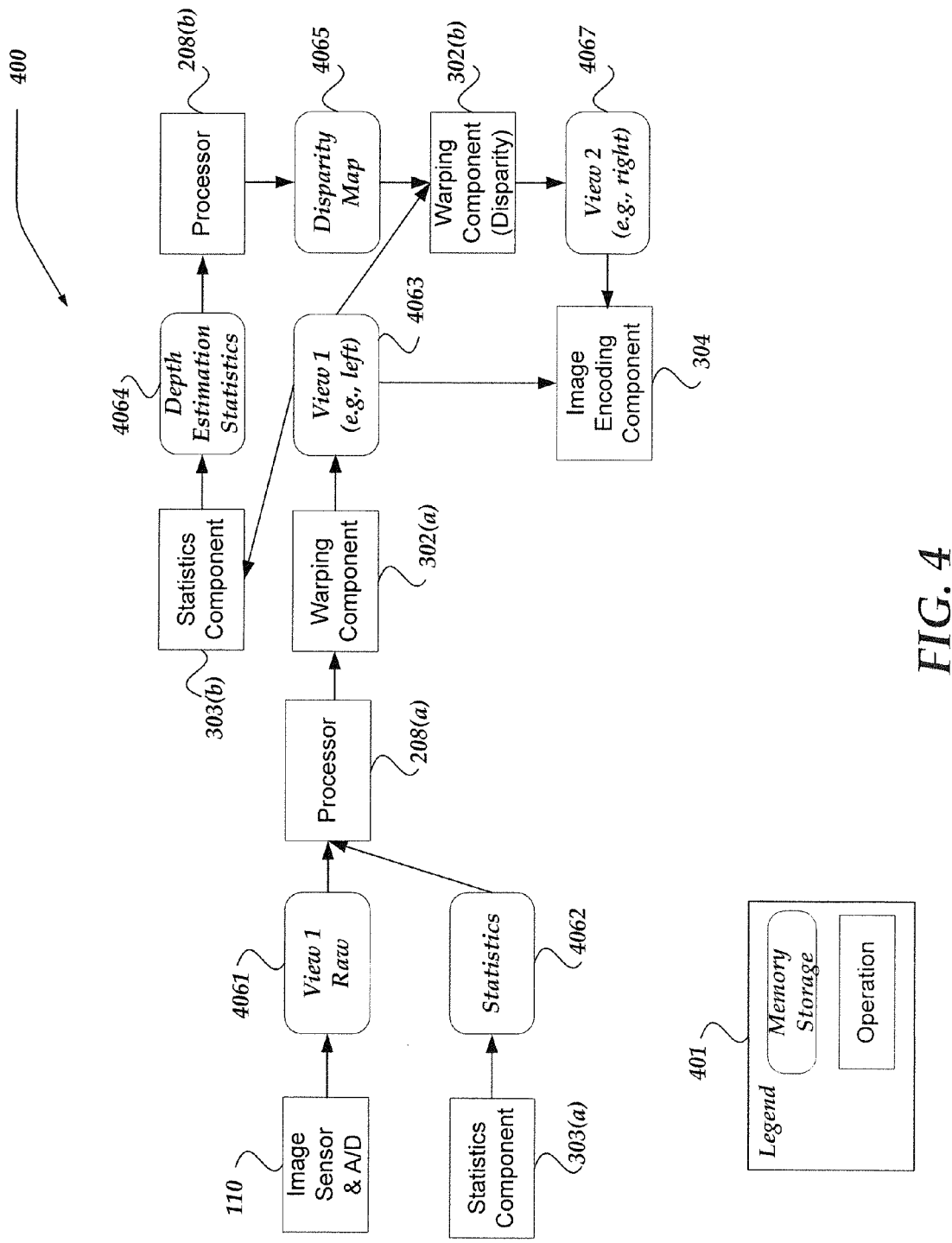
FIG. 4 illustrates one embodiment of data/process flow within a pipelined architecture for dynamically creating three-dimensional video sequences in real time from captured two dimensional video sequences.

One possible embodiment of pipelining the operations are illustrated in FIG. 4, which illustrates one embodiment of data/process flow within a pipelined architecture for dynamically creating three-dimensional video sequences in real time from captured two dimensional video sequences. Pipeline architecture 400 of FIG. 4 may include many more or less components than those shown. The components shown, however, are sufficient to disclose an illustrative embodiment for practicing various embodiments.

As shown in FIG. 4's legend 401, some of the components illustrated indicate storage of data (curved boxes), while other components indicate actions performed by a component of FIGS. 1-3. As shown in FIG. 4, the component numbering may include an (a) or (b) indicating that the same component may be employed in the pipelining operations multiple times.

Architecture 400 begins at image sensor & A/D 110 where an image is captured. In one embodiment, the image is captured in a raw (Bayer format). However, image sensor & A/D 110 may also convert the image to another format, such as YUV. In any event, the captured image may be placed into memory (as illustrated as view 1 raw 4061). In parallel, statistics component 303($a$) may perform actions on view 1 raw 4061 and place AAA statistics into memory as statistics 4062. The AAA statistics may then be used by processor 208($a$) to process the raw image (view 1 raw 4061) to a full color image and also to control exposure and/or lens position of a next frame or frames capture.

The processes (full color) image is then sent to warping component 302($a$) to correct for lens distortion, and/or other issues. The processed frame may again be placed into memory as view 1 (e.g. left eye perspective view) 4063, for access by other components in the pipeline. As shown, the view 1 4063 may then be processed again by statistics component 303 (now indicated as 303($b$)), which extracts specific statistics to estimate depth, the output being depth estimation statistics 4064. Process 208($b$) may retrieve depth estimation statistics 4064, performs depth estimation, and calculates disparity map 4065. Warping component 302($b$) uses disparity map 4065 to generate a second perspective view (e.g., a right eye view)—view 2 4067. Both view 1 4063 and view 2 4067 frames are then sent to image encoding component 304, which orders the frames in one of any 3D video packing formats, including, but not limited to field/frame packing, planar or interleaved, top-bottom, side-by-side, or the like. Further, image encoding component 304 may encode the frames using one or any video compression mechanisms, including, H.264, MPEG-4, or the like. The resulting encoded 3D bitstream may then be provided to a display device, stored into memory, or even sent over a network to another device.

Figure 5:
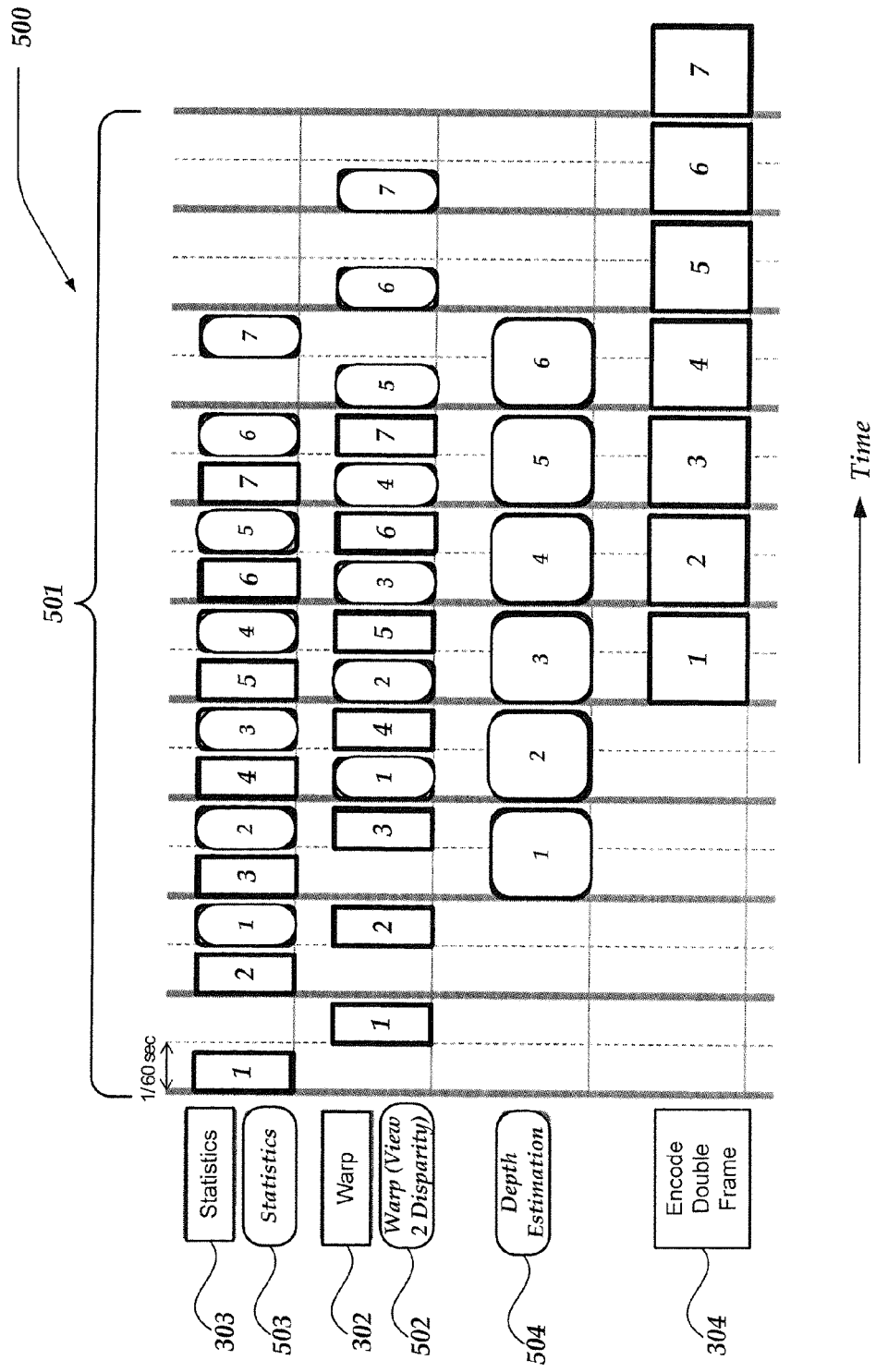
FIG. 5 illustrates one non-limiting, non-exhaustive example of pipelining operations of FIG. 4.

FIG. 5 illustrates one non-limiting, non-exhaustive example of a process of pipelining operations of FIG. 4. Pipelining process 500 of FIG. 5 may include many more or less components than those shown. The components shown, however, are sufficient to disclose an illustrative embodiment for practicing various embodiments. Moreover, as shown in FIG. 5, some of the components illustrated indicate storage of data (curved boxes), while other components indicate actions performed by a component of FIGS. 1-4.

Pipelining process 500 shows one embodiment, of how architecture 400 of FIG. 4 may be implemented in a time-lapse diagram, where time is shown as increasing from left to right, and the pipelined operations and data are shown on the left. Also shown is a sequence of frames 501, where numbers within the frames represent frame identifiers, showing to which frame an operation relates to. A 3D frame in FIG. 5 may be generated every 1/30 seconds, and the warping component 302 and statistics 303 components time are divided into intervals of 1/60 seconds. Half of the time is used to execute a first capture flow for view 1, as discussed above in FIG. 4, and the other half of the time is used to execute the depth estimation and 2D to 3D flow discussed in FIG. 4.

As can be seen, a two dimensional image frame sequence is received. As shown, the frames within the sequence are identified as 107, although many more or less frames within the sequence of frames may be received. In one embodiment, each frame is considered to be received when it is captured by image sensor & A/D component 110 of FIG. 1. Then, as illustrated various statistics are determined. For example, such statistics may include auto focus, auto exposure, and auto white balance statistics (AAA statistics) for each received frame in the two dimensional image frame sequence (statistics 503). For each frame, as discussed elsewhere herein, distortion and other anomalies are removed using the warping component 302 to produce a first view perspective for the frame. The statistics component 303 is then executed again on each of the resulting frame from the warping component to generate estimated depths 504 for each resulting frame. From the estimated depths for each frame, a disparity map is generated, and then used to convert the two dimensional image frame sequence to a three dimensional image frame sequence, as described further below, at least by creating a second view perspective for each frame.

In one embodiment, the first perspective view and the second perspective view are combined using the image encoding component (encode double frame) 304.

Using AAA Statistics to Estimate Depth

Figure 6:
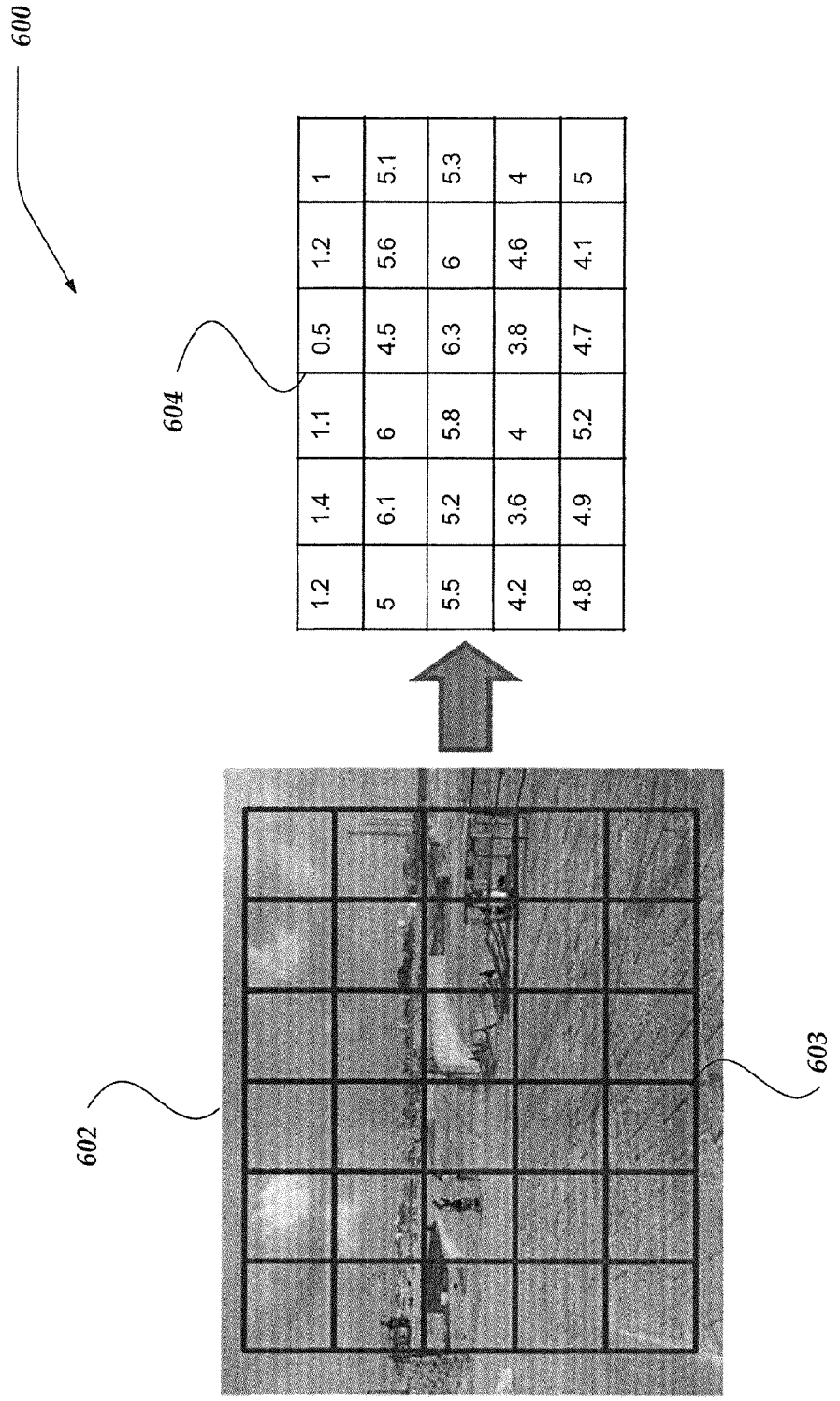
FIG. 6 illustrates one non-limiting, non-exhaustive example of generating statistics from an image frame useable in estimating depth.

As discussed above, autofocus statistics may be used to obtain an estimate of depth in an image. Autofocus statistics typically measure, for example, a maximal derivative of an image in a given window, where an image may be divided into a plurality of windows. FIG. 6 illustrates one non-limiting, non-exhaustive example of generating statistics from an image frame useable in estimating depth.

As shown in FIG. 6, is an image 602 having been overlaid, or divided into a plurality of windows (sometimes referred to as blocks) 603. The number of windows (or blocks) may be selected based on engineering judgment, and need not include a same number of window rows as window columns. Shown in the figure, windows 603 is a 5×6 matrix, although others may be selected.

Also illustrated is a map 604 of the generated maximal derivatives for each window. System 100 of FIG. 1 may use these derivatives to manipulate a position of a lens in order to provide auto focus features to a user. To provide auto exposure, a maximal and minimal pixel (or luma) value for each window may be calculated. For auto white balance, a mean pixel value for each window may also be calculated.

Letting D be the maximal derivative, and M and m be the maximal and minimal pixel values, respectively, and A be the average pixel values, then:

$$\frac{D}{M-m}, \frac{D}{M-m},$$

and $$\frac{D}{A-m}$$

are estimators of the relative maximal slopes (meaning, the maximal slope normalized by the height of an edge) in each window. In one embodiment, the maximal derivative represents the maximum slope of an edge of an image portion within a window. As noted above, this maximal derivative may be normalized by some measure of variance, such as a difference between M and m, and/or A and m, or the like.

Figure 7:
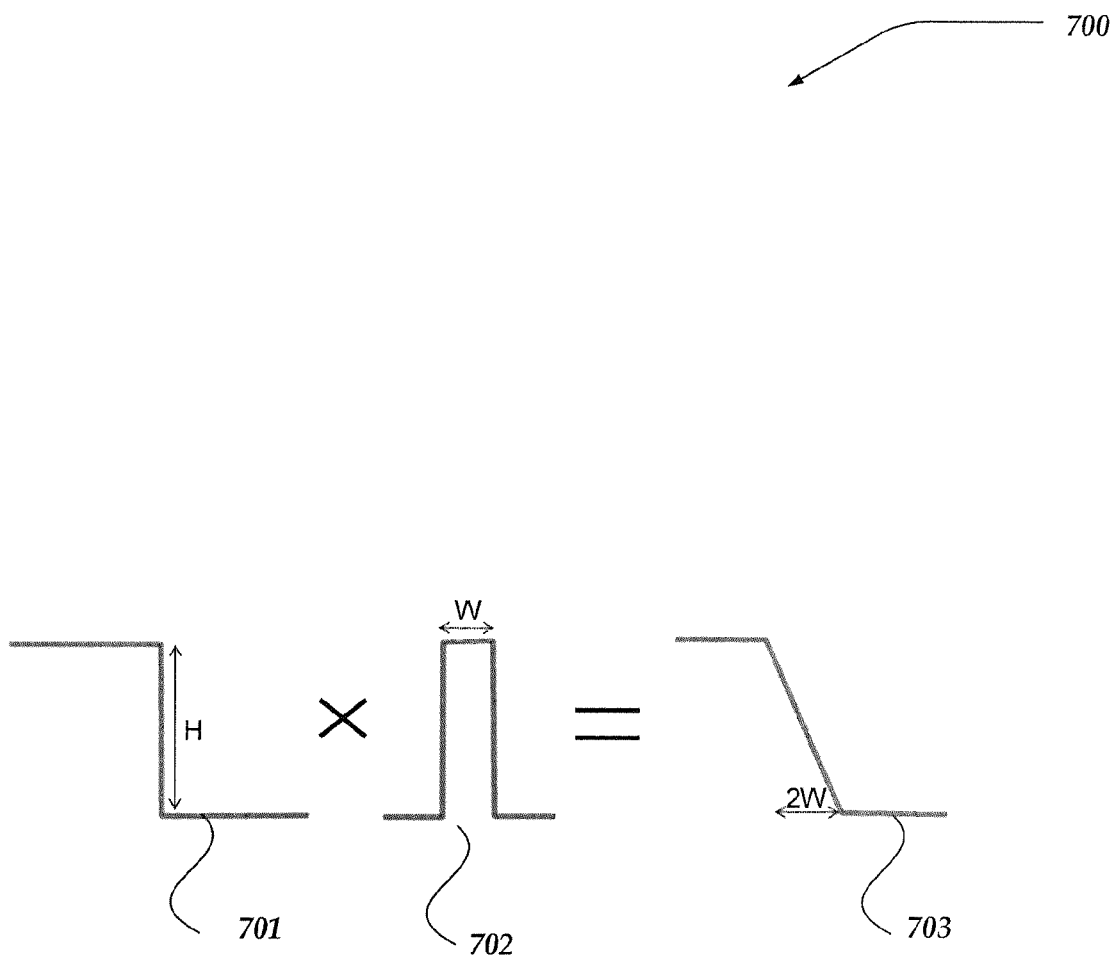
FIG. 7 illustrates one non-limiting, non-exhaustive one-dimensional example of convolving with a blurring kernel consistent with a lens defocus.

FIG. 7 illustrates one non-limiting, non-exhaustive one-dimensional example of convolving with a blurring kernel consistent with a lens defocus. That is, process 700 of FIG. 7 illustrates one embodiment of how a lens blurring kernel might operate on an ideal edge within a window. As shown, edge 701 represents an ideal edge of width zero, and height H. Edge 701 is convolved (indicated by X) or blurred by a kernel 702 of width W to produce edge 703 having an edge of height H and width 2W. The maximal derivative D then would evaluate to about $$\frac{H}{2W},$$

and $$\frac{D}{M-m}$$

would give $(2W)^{-1}$. Therefore, if a strong ideal edge exists in a given window, the above metric can be used to directly estimate a width of the blurring kernel.

When system 100 is focused at a nearest object in a scene, the further an object is from the system's lens, the greater its defocus blur is likely to be, and that defocus blur will have a wider kernel. Therefore, it is submitted that the above AAA statistics may be used, in one embodiment, to estimate depth, as discussed further below.

One Embodiment of Depth Estimation

For each window, the inputs to depth estimation include the measurements D. M, m, and A, as described above. The normalized maximal derivative is given by $$\hat{D} = \frac{D}{M-m}.$$

For each window, an initial depth estimate may be formed as: $\hat{z}=F_c(\hat{D})$, where $F_n: \mathbb{R} \to \mathbb{R}$ is a function that maps the normalized maximal derivative to depth, given a camera parameter vector c, where c contains the camera's focal length, focus position, aperture, and other parameters. Then, for every possible c, the function $F_c$ is unique and can be learned, during, for example, a calibration process that may be performed during production, or elsewhere. Alternatively, arbitrary functions may be chosen without calibration, giving depth estimates which might be sufficient to provide a 3D feel to the resulting images.

However, the assumption that $\hat{D}$ can be used to estimate $\hat{Z}$ does not hold in all cases. Rather, it holds when there are strong edges present in a given window. However, for any of a variety of reasons, a window may not include a strong edge. This may arise based on a characteristic of the image, a number of windows selected in which to divide the image, or the like.

Therefore, to address cases in which this assumption does not hold, a validity indication may be maintained for each depth estimate. The validity of the measurement may be checked by making sure that a gray level distribution in a window is wide and in the sensor's dynamic range. This may be done, for example, by making sure that M is not close to saturation (by a definable tolerance value), m is not close to an intrinsic noise level (by some other definable tolerance value), and A is not close to m or M (that is, the distribution is not heavy tailed) (by some other tolerance values), and further that D is above some defined threshold value. If any of these evaluations are found to be invalid, then it may be determined that for the given window, there exists an invalid 'hole.'

Figure 8:
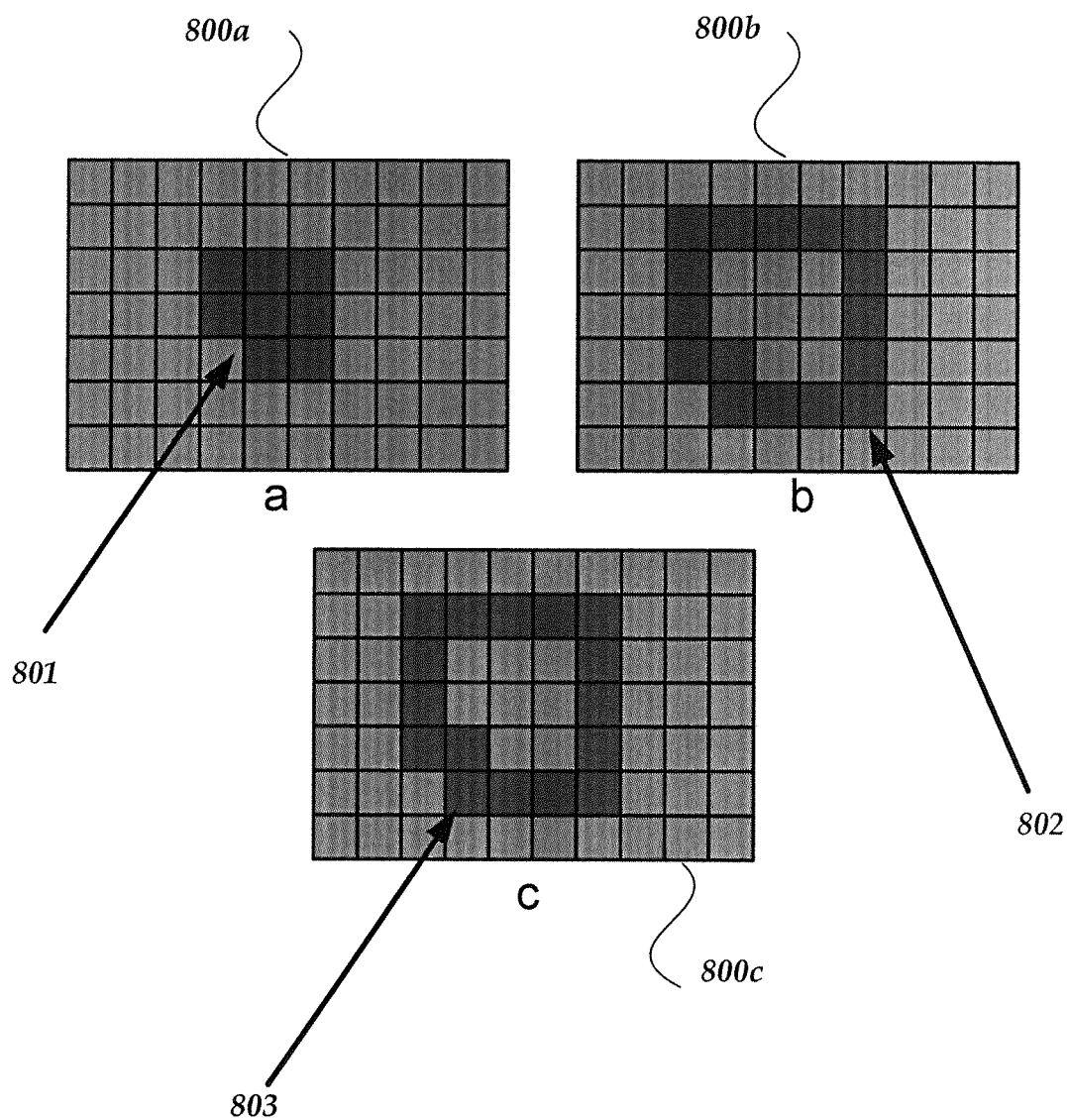
FIG. 8 illustrates one non-limiting, non-exhaustive example of resolving invalidity holes within a depth map.

These holes however, may be filled using the following procedure, which is illustrated in FIG. 8. That is, FIG. 8 illustrates one non-limiting, non-exhaustive example of resolving invalidity holes within a depth map. As shown in FIG. 8 image 800a illustrates a plurality of connected windows, with a subset of windows 801 having been determined to have invalid 'holes,' based on the criteria discussed above. Connected windows are those windows having invalid 'holes' that are adjacent to each other, or connected, to form a single unitary form, such as shown by windows 801. Finding windows 801 may be performed, for example, using a process such as "connected components analysis,' where the map of invalid measurements is scanned and each measurement is labeled with a label that corresponds to any invalid neighbors that the invalid window may have.

Then, for each connected 'blob' or connected windows 801, each being invalid, a border 802 (seen for image 800b) is found for the invalid region created by the windows 801. The border is composed of windows surrounding the invalid windows 801, where each of the windows within the border 802 has valid measurements. In one embodiment, the border 802 may be determined using morphological dilation and subtraction. Because the blob or connected windows 801 is connected, it has no invalid neighbors, so the entire border 803 has all of its windows having valid measurements.

The hole of connected windows 801 may then be filled with values from the border 803. For example, in one embodiment, the hole may be replaced by an average value of all of the windows constituting border 803, effectively removing the invalid hole.

Figure 9:
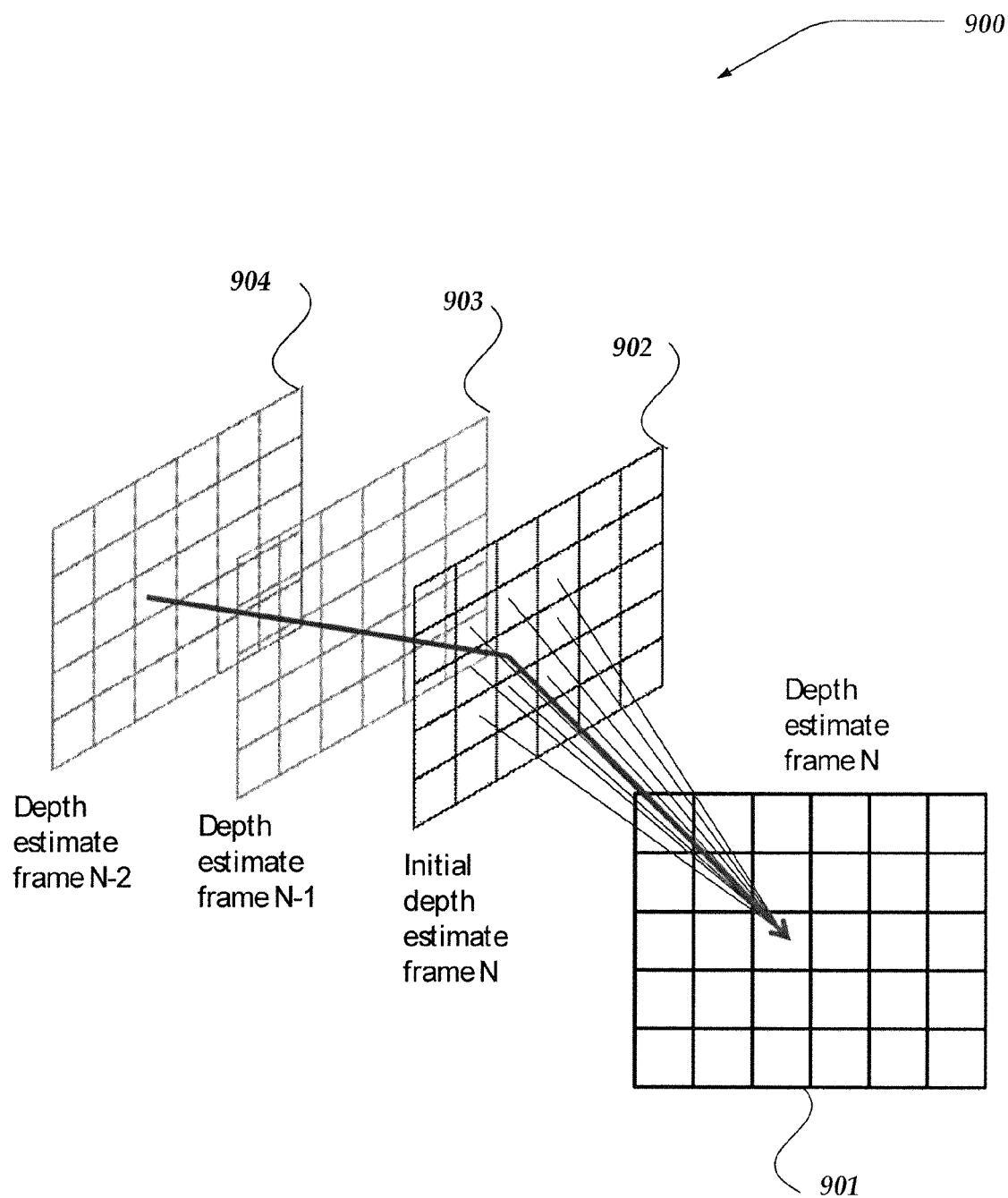
FIG. 9 illustrates one non-limiting, non-exhaustive example of spatial-temporal filtering of depth estimates.

In one embodiment, the depth estimate map may be further cleaned using a 2D spatial linear or median filter. To provide temporal consistency of the depth estimate, temporal filtering may be used. FIG. 9 illustrates one non-limiting, non-exhaustive example of spatial-temporal filtering of depth estimates. Shown is a 3×3 spatial and 2 frame temporal neighborhood, where map 904 represents a depth estimate for frame N−2, map 903 represents a depth estimate for frame N−1, and map 902 represents an initial depth estimate for frame N.

Putting the example, above into equation form, let E(x,y,t) is the depth estimate for frame t at the block indexed with x and y. Let $E_\square(x,y,t)$ be the initial depth estimate, with the same indexing. Then:

$$E(x, y, t) = \sum_{t'=1}^{Z} \beta_{t'} E(x, y, t-t') + \sum_{x'=-1}^{1} \sum_{y'=-1}^{1} \alpha_{x',y'} E_o(x+x', y+y', t)$$

Where:

$$\sum_{t'=1}^{Z} \beta_{t'} + \sum_{x'=-1}^{1} \sum_{y'=-1}^{1} \alpha_{x',y'} = 1$$

The above represents a temporal infinite impulse response (IIR) and spatial finite impulse response (FIR). Having a final depth estimate E, the disparity may be calculated, where disparity is the horizontal distance used to move each object in the image in order to create the second perspective view.

Letting h denote half the distance between the two camera (where as discussed above, the second camera is imaginary), and R represents the distance to the object (or plane) in focus. Then E is the estimated distance from the object in focus which occupies the window, and f is the camera focal length. This is shown further in FIG. 10, which illustrates one non-limiting, non-exhaustive example 1000 of deriving disparity data from depth estimates for use in converting two-dimensional captured images into three-dimensional images in real time. Shown in the example, are real camera center 1002, second (simulated or imaginary) camera 1005, real camera image plane 1003, second (simulated or imaginary) camera plane 1004, objects 1012 and 1014.

Figure 10:
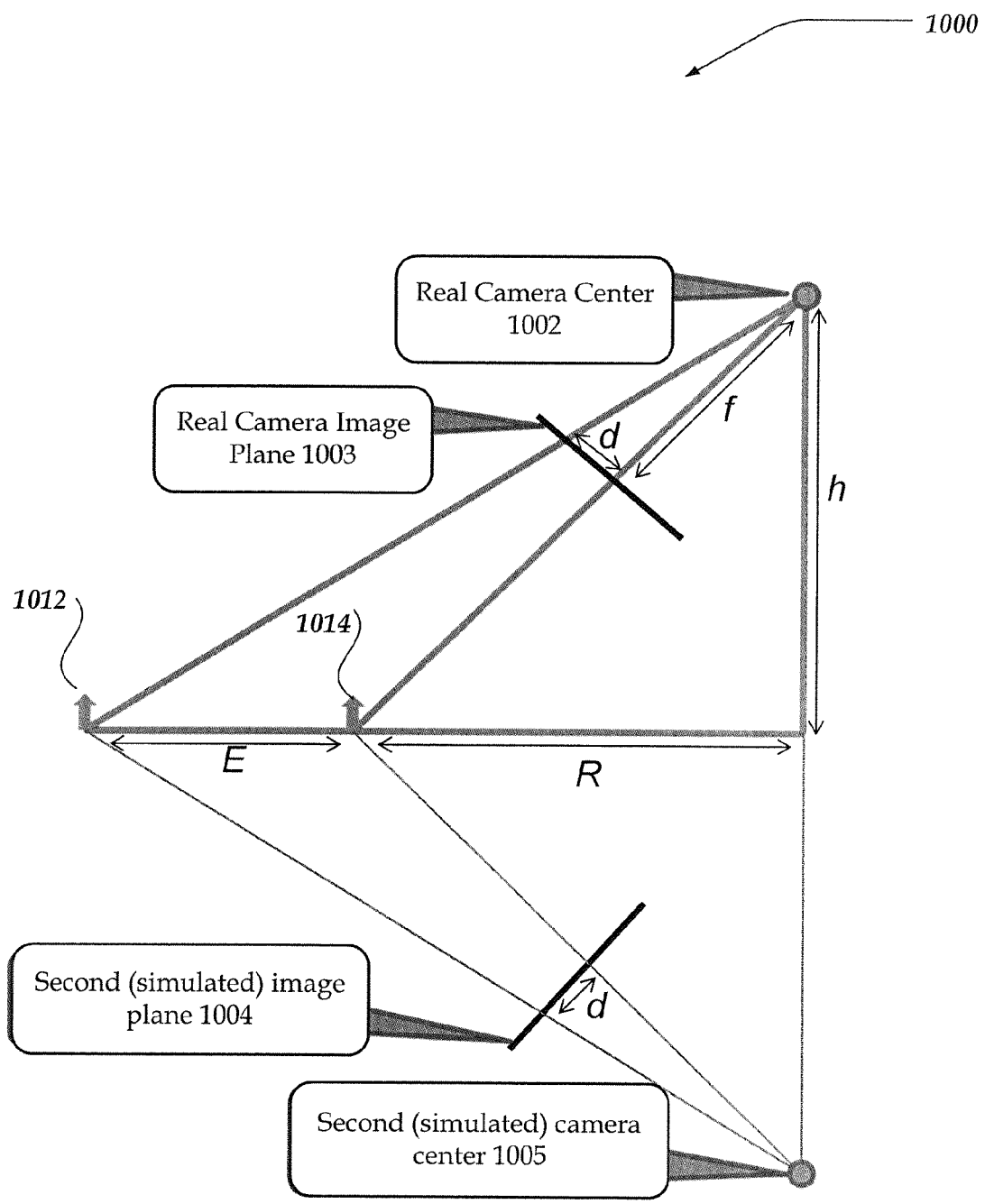
FIG. 10 illustrates one non-limiting, non-exhaustive example of deriving disparity data from depth estimates for use in converting two-dimensional captured images into three-dimensional images in real time.

As shown, the camera (real camera center 1012) in FIG. 10 is pointed at the object 1012, and from symmetry, the disparity is 2d, where d is shown below. Then assuming that h<<R, the relationship may be derived as:

$$d \approx \frac{fhE}{R(R+E)}$$

Therefore, the disparity, which may be denoted as Q, is functionally dependent on E:

$$Q = K_1 E(K_2 + E)^{-1}, \text{ where } K_1 = 2fhR^{-1} \text{ and } K_2 = R$$

Then selecting $K_1$ and $K_2$ as a means to control an amount of 3D that is applied to the image, the strength of the correction may be controlled. Now, having a disparity value Q, for each window, this value may be assigned as the disparity of the pixel at the center of each window for the image. Then disparity values may be obtained by interpolating for each of the rest of the pixels and warping the image according to the disparity values for each pixel in order to obtain the second perspective view of the object—see object 1014 of FIG. 10, as an example. That is, the warping component may interpolate the values for each pixel as well as interpolate actual pixel values.

It is noted that while the above provides a complete description for generating three dimensional images from two-dimensional images, in other embodiments, additional depth cues may be employed to further refine the above depth estimates. For example, in one embodiment, many camera processors may perform object detections, such as might be used for facial detection, or the like. These processors may provide location and/or size information for each of the detected objects. Therefore, in one embodiment, this information may be used to gauge relative depth of regions in an image. The object size being determined, so given, the camera's focal length and measured size, a distance of the object from the camera (and hence depth) may be determined as the inverse of this distance.

In still another embodiment, some camera may be equipped with digital video stabilization technology to manage camera movements as they may impact a captured image. In one embodiment, these cameras may provide measures of motion of the camera by comparing two consecutive frames for optical flow. These measurements may, in one embodiment, be used to estimate a camera's ego motion, by estimating a fundamental epipolar matrix. Then, knowing this, can translate the relative motion of each object to parallax, which provides an inverse relationship to depth. Thus, a variety of techniques for estimating depth are envisaged and hence, embodiments are not limited to a particular mechanisms for estimating depth, useable in dynamically creating three dimensional images in real time video rate from captured two dimensional images.

Moreover, it will be understood that each component of the flowcharts and combinations of components in these illustrations, can be implemented by computer program instructions. These program instructions may be provided to a processor to produce a machine, such that the instructions, which execute on the processor, create means for implementing the actions specified in the flow component or components. The computer program instructions may be executed by a processor to cause a series of operational steps to be performed by the processor to produce a computer-implemented process such that the instructions, which execute on the processor to provide steps for implementing the actions specified in the flow component or components. The computer program instructions may also cause at least some of the operational steps shown in the components of the flows to be performed in parallel. Moreover, some of the steps may also be performed across more than one processor, such as might arise in a multi-processor computer system. In addition, one or more components or combinations of components in the flow illustrations may also be performed concurrently with other components or combinations of components, or even in a different sequence than illustrated.

Accordingly, components of the flow illustrations support combinations of means for performing the specified actions, combinations of steps for performing the specified actions and program instruction means for performing the specified actions. It will also be understood that each component of the flow illustrations, and combinations of components in the flow illustrations, can be implemented by special purpose hardware-based systems, which perform the specified actions or steps, or combinations of special purpose hardware and computer instructions.

What is claimed as new and desired to be protected by Letters Patent of the United States is:

1. A processor based method, comprising:
   capturing a two dimensional image frame sequence with an image sensor; and
   performing a plurality of actions at a real time video rate with at least one integrated circuit having a plurality of components thereon operating in a pipeline architecture, including:
   receiving a captured two dimensional image frame in the two dimensional image frame sequence, the received frame representing a first view perspective;
   dividing the received frame into a plurality of windows;
   determining auto focus, auto exposure, and auto white balance statistics for the received frame, the determination of auto focus statistics comprising calculating, for each window of the received frame, a maximal derivative by a maximal pixel value, a minimal pixel value, and an average pixel value of the window;
   for each window, (i) determining a lens blurring kernel by using the calculated maximal derivative for the window and (ii), in response to an edge being present in the window, convolving the edge and the determined lens blurring kernel;
   correcting lens distortion by applying a transformation to the received frame;
   generating estimated depths for the transformed frame based at least in part on the maximal derivatives of the plurality of windows;
   generating a disparity map by using the estimated depths for the transformed frame; and
   using the disparity map to generate from the transformed frame a second view perspective for the received frame, the received frame and the generated second view forming a stereoscopic image pair providing three dimensional perception.

2. The method of claim 1, wherein generating the estimated depths comprises:
   determining whether the maximal derivatives validly estimate the depth for each of the plurality of windows based at least on a comparison of the maximal pixel value for each window being unsaturated, the minimal pixel value being above an intrinsic noise level, the average pixel value being not close to the maximal or minimal pixel values by a threshold value, and the maximal derivative being above another threshold; and
   when the maximal derivative does not validly estimate the depth for the window:
   scanning each window for the given frame to identify connected invalid windows;
   determining a border of windows surrounding the connected invalid windows; and
   replacing the maximal derivatives for each of the surrounding connected invalid windows with values obtained from the border of windows.

3. The method of claim 1, wherein using the disparity map to generate from the transformed frame the second view perspective for the received frame, further comprises:
   for each window:
   using a disparity value from the disparity map as a disparity of a pixel at a center of the window; and
   interpolating disparity values for each other pixel within the window using the disparity at the center; and
   warping the transformed frame using the disparity values for each of the pixels for the transformed frame to generate the second view perspective.

4. The method of claim 1, wherein the plurality of components include at least a statistics component used to determine the auto focus statistics and generate the estimated depths, and a warping component used to correct lens distortion within the first view perspective.

5. The method of claim 1, wherein generating estimated depths comprises applying a spatial-temporal filter to estimated depths for the transformed frame using depth estimates from at least two previous frames within the two dimensional image frame sequence.

6. The method of claim 1, wherein performing the plurality of actions comprises:
encoding the three dimensional image frame using at least one three dimensional video packing format, including at least one of a field/frame packing, a planar or interleaved mechanism, a top-bottom mechanism, or a side-by-side mechanism.

7. An image system, comprising:
an image sensor configured to receive a two dimensional image frame sequence; and
at least one integrated circuit having a plurality of components thereon operating in a pipeline architecture to perform a plurality of actions at a real time video rate, including:
receiving a received two dimensional image frame in the two dimensional image frame sequence, the received frame representing a first view perspective;
dividing the received frame into a plurality of windows;
determining auto focus, auto exposure, and auto white balance statistics for the received frame, the determination of auto focus statistics comprising calculating, for each window of the received frame, a maximal derivative by using a maximal pixel value, a minimal pixel value, and an average pixel value of the window;
for each window, (i) determining a lens blurring kernel by using the calculated maximal derivative for the window and (ii), in response to an edge being present in the window, convolving the edge and the determined lens blurring kernel;
correcting lens distortion by applying a transformation to the received frame;
generating estimated depths for the transformed frame based at least in part on the maximal derivatives of the plurality of windows;
generating a disparity map by using the estimated depths for the transformed frame; and
using the disparity map to generate from the transformed frame a second view perspective for the received frame, the received frame and the generated second view perspective forming a stereoscopic image pair providing three dimensional perception.

8. The image system of claim 7, wherein generating the estimated depths comprises:
determining whether the maximal derivatives validly estimate the depth for each of the plurality of windows based at least on a comparison of the maximal pixel value for each window being unsaturated, the minimal pixel value being above an intrinsic noise level, the average pixel value being not close to the maximal or minimal pixel values by a threshold value, and the maximal derivative value is being above another threshold; and
when the maximal derivative does not validly estimate the depth for the window:
scanning each window for the given frame to identify connected invalid windows;
determining a border of windows surrounding the connected invalid windows; and
replacing the maximal derivatives for each of the surrounding connected invalid windows with values obtained from the border of windows.

9. The image system of claim 7, wherein using the disparity map to generate from the transformed frame the second view perspective for the received frame, further comprises:
for each window:
using a disparity value from the disparity map as a disparity of a pixel at a center of the window; and
interpolating disparity values for each other pixel within the window using the disparity at the center; and
warping the transformed frame using the disparity values for each of the pixels for the transformed frame to generate the second view perspective.

10. The image system of claim 7, wherein the plurality of components include at least a statistics component used to determine the auto focus statistics and generate the estimated depths, and a warping component used to correct lens distortion within the first view perspective.

11. The image system of claim 7, wherein generating estimated depths comprises applying a spatial-temporal filter to estimated depths for the transformed frame using depth estimates from at least two previous frames within the two dimensional image frame sequence.

12. The image system of claim 7, wherein to perform the plurality of actions comprises:
encoding the three dimensional image frame using at least one three dimensional video packing format, including at least one of a field/frame packing, a planar or interleaved mechanism, a top-bottom mechanism, or a side-by-side mechanism.

13. A non-transitory computer readable storage medium having stored thereon instructions that, when executed, enables actions comprising:
performing a plurality of actions at a real time video rate by operating in a pipeline architecture, including:
receiving a captured two dimensional image frame in a two dimensional image frame sequence, the received frame representing a first view perspective;
dividing the received frame into a plurality of windows;
determining auto focus, auto exposure, and auto white balance statistics for the received frame, the determination of auto focus statistics comprising calculating, for each window of the received frame, a maximal derivative by a maximal pixel value, a minimal pixel value, and an average pixel value of the window;
for each window, (i) determining a lens blurring kernel by using the calculated maximal derivative for the window and (ii), in response to an edge being present in the window, convolving the edge and the determined lens blurring kernel;
correcting lens distortion by applying a transformation to the received frame;
generating estimated depths for the transformed frame based at least in part on the maximal derivatives of the plurality of windows;
generating a disparity map by using the estimated depths for the transformed frame; and
using the disparity map to generate from the transformed frame a second view perspective for the received frame, the received frame and the generated second view forming a stereoscopic image pair providing three dimensional perception.

14. The non-transitory computer readable storage medium of claim 13, wherein generating the estimated depths comprises:
determining whether the maximal derivatives validly estimate the depth for each of the plurality of windows based at least on a comparison of the maximal pixel value for each window being unsaturated, the minimal pixel value being above an intrinsic noise level, the average pixel value being not close to the maximal or minimal pixel values by a threshold value, and the maximal derivative being above another threshold; and
when the maximal derivative does not validly estimate the depth for the window:

scanning each window for the given frame to identify connected invalid windows;

determining a border of windows surrounding the connected invalid windows; and replacing the maximal derivatives for each of the surrounding connected invalid windows with values obtained from the border of windows.

15. The non-transitory computer readable storage medium of claim 13, wherein using the disparity map to generate from the transformed frame the second view perspective for the received frame, further comprises:

for each window:

using a disparity value from the disparity map as a disparity of a pixel at a center of the window; and interpolating disparity values for each other pixel within the window using the disparity at the center; and warping the transformed frame using the disparity values for each of the pixels for the transformed frame to generate the second view perspective.

16. The non-transitory computer readable storage medium of claim 13, wherein generating estimated depths comprises applying a spatial-temporal filter to estimated depths for the transformed frame using depth estimates from at least two previous frames within the two dimensional image frame sequence.

17. The non-transitory computer readable storage medium of claim 13, wherein performing the plurality of actions comprises:

encoding the three dimensional image frame using at least one three dimensional video packing format, including at least one of a field/frame packing, a planar or interleaved mechanism, a top-bottom mechanism, or a side-by-side mechanism.

* * * * *